United States Patent [19]

Koyama et al.

[11] Patent Number: 5,764,321
[45] Date of Patent: Jun. 9, 1998

[54] ACTIVE MATRIX TYPE LIQUID CRYSTAL DISPLAY DEVICE HAVING NON-OVERLAPPING PERIPHERAL CIRCUITS

[75] Inventors: Jun Koyama; Yuji Kawasaki; Satoshi Teramoto, all of Kanagawa, Japan

[73] Assignee: Semiconductor Energy Laboratory Co., Ltd., Kanagawa-ken, Japan

[21] Appl. No.: 861,428

[22] Filed: May 21, 1997

Related U.S. Application Data

[63] Continuation of Ser. No. 451,546, May 26, 1995, abandoned.

[30] Foreign Application Priority Data

May 31, 1995 [JP] Japan .................................. 6-142447

[51] Int. Cl.⁶ ........................................................ G02F 1/136
[52] U.S. Cl. ........................................................ 349/648
[58] Field of Search .............................. 359/54, 55, 58, 359/59, 60; 349/42, 48

[56] References Cited

U.S. PATENT DOCUMENTS

| | | | |
|---|---|---|---|
| 4,643,527 | 2/1987 | Magarino et al. | 359/59 |
| 4,709,992 | 12/1987 | Ueno | 359/60 |
| 5,061,040 | 10/1991 | Yaniv et al. | 359/60 |
| 5,148,297 | 9/1992 | Ishii et al. | 359/58 |
| 5,337,172 | 8/1994 | Lehureau | 359/59 |

FOREIGN PATENT DOCUMENTS

61-4018   1/1986   Japan ................................. 349/110

*Primary Examiner*—William L. Sikes
*Assistant Examiner*—James A. Dudek
*Attorney, Agent, or Firm*—Sixbey, Friedman, Leedom & Ferguson, PC; Gerald J. Ferguson, Jr.; Eric J. Robinson

[57] ABSTRACT

In an active matrix type liquid crystal display device which a liquid crystal is arranged between a pair of substrates, two TFTs are connected with each of the corresponding electrodes (for one pixel) formed on the substrates. The liquid crystal is driven and switched by the two TFTS. Since a voltage applied to the liquid crystal is divided by the two TFTS, a higher voltage than a withstanding voltage of a TFT is applied to the liquid crystal, so that voltages applied to the TFTs, that is, voltages applied between a source and a drain of each TFT are decreased. The voltages each has an opposite phase.

29 Claims, 11 Drawing Sheets

IMPURITY ION IMPLANTATION AND
LASER LIGHT IRRADIATION

ACTIVE MATRIX TYPE LIQUID CRYSTAL DISPLAY DEVICE HAVING NON-OVERLAPPING PERIPHERAL CIRCUITS

This application is a Continuation of Ser. No. 08/451,546, filed May 26, 1995, now abandoned.

BACKGROUND OF THE INVENTION

The present invention relates to an electro-optical device.

An active matrix type liquid crystal display device has been researched and developed. In the active matrix type liquid crystal display device, thin film transistors (TFTs) for switching are arranged in each pixel, and an electric field is applied to a liquid crystal in a pixel when necessary.

Figure 2:
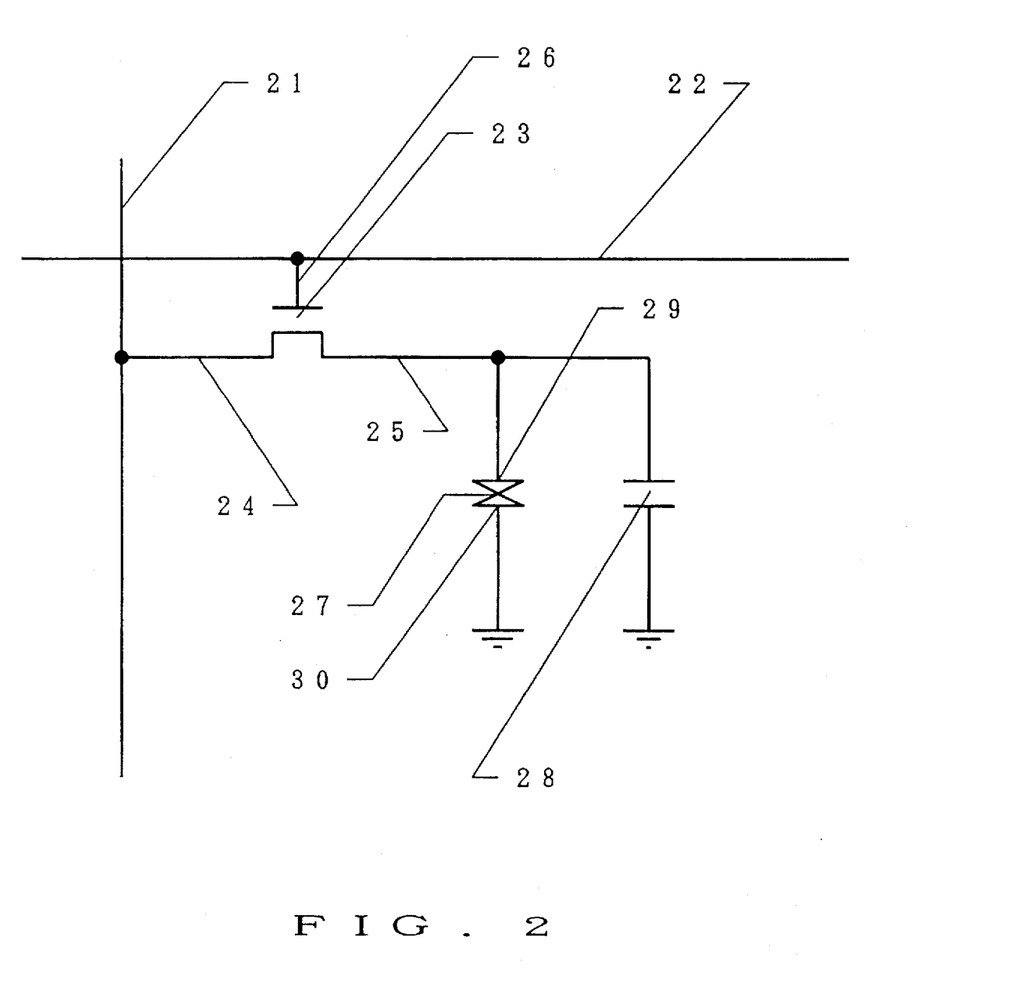
FIG. 2 shows a schematic conventional pixel portion.

FIG. 2 shows a structure of one pixel in a conventional known active matrix type liquid crystal display device. In FIG. 2, a pixel electrode 29 contacting with a liquid crystal 27 is connected with a drain 25 of a TFT 23 for switching. When a desired voltage is applied between a source 24 and the drain 25 of the TFT 23 and a signal is supplied from a gate line 22 to a gate 26 of the TFT 23, a resistance between the source 24 and the drain 25 is decreased, so that charges flow from the source 24 into the pixel electrode 29. Also, since the other pixel electrode 30 contacting with the liquid crystal 27 is maintained to an earth voltage, that is, the electrode 30 is earthed, an electric field having a desired strength is applied to the liquid crystal. A state of a liquid crystal changes by influences of the electric field, so that the display is performed. A retaining capacitor 28 is used to obtain a suitable capacitance as a load in a TFT.

When the structure of FIG. 2 is used, a maximum applicative voltage applied to the liquid crystal 27 is limited by a maximum applicative voltage applied between the source 24 and the drain 25 of the TFT 23.

Generally, a withstanding voltage of a TFT is low. Also, deterioration of characteristics in a TFT produces easily. The degree of deterioration reduces in accordance with decreasing of a voltage applied between the source and the drain of a TFT. Therefore, it is preferred that a voltage applied between the source and the drain of a TFT is lower.

Also, it is required that an OFF current of a TFT arranged in a pixel is lower. For example, in the structure of FIG. 2, charges flowing into the pixel electrode 29 must be retained for a necessary time. That is, when charges must be retained, a TFT must be turned off to prevent flow of the charges from the drain 25 into the source 24. However, when a current (OFF current) flows in a case wherein a TFT is turned off, charges stored in the pixel electrode 29 flow gradually, so that accurate display cannot be performed. That is, frame display cannot be held for a necessary time.

An OFF current of a TFT is proportional to a voltage applied between the source and the drain. That is, when the voltage applied between the source and drain is low, the OFF current is low. Therefore, to decrease the OFF current, it is desired that an operation voltage be low.

In general, when a twisted nematic (TN) type or a super twisted nematic (STN) liquid crystal is used and is driven using an alternating signal, a maximum voltage that can be applied to the liquid crystal is half or less of a maximum voltage applied to a TFT. Further, two TFTs are connected with each other substantially, so that the connected TFTs corresponds to a multi-gate TFT. Therefore, since a leak current in a depletion layer of a drain can be reduced, an OFF current can be decreased double.

Therefore, in general, a voltage applied between the source 24 and the drain 25 of the TFT 23 is half of a maximum value of a voltage applied to the liquid crystal 27. When a voltage applied between the source and the drain is low, a voltage applied to the liquid crystal is low. However, if it is necessary to improve responses of the liquid crystal and obtain high quality display in general, a voltage applied to the liquid crystal must be high to a certain extent.

As described above, to decrease the OFF current of a TFT, it is desired that a voltage applied between the source and the drain of a TFT connected with a pixel electrode is lower. On the other hand, to improve responses of the liquid crystal and obtain high quality display, it is necessary to apply a desired voltage to TFT. However, if a voltage applied between the source and the drain of a TFT is determined to obtain a generally allowable OFF current value, the determined voltage becomes smaller than a voltage necessary to drive (apply) a liquid crystal.

SUMMARY OF THE INVENTION

The object of the present invention is to obtain at least one of the following matters.

(1) Characteristics of an active matrix type liquid crystal display device and its reliability improve.

(2) A voltage applied between the source and the drain of a TFT (for switching) arranged in a pixel electrode of a liquid crystal display device is set to be low, and simultaneously a voltage which can be applied to a liquid crystal is set to be high.

(3) In a structure for controlling a voltage applied between a pair of electrodes in accordance with a TFT, a voltage applied between the source and the drain of a TFT is set to be lower, and a voltage applied between a pair of electrodes is set to be higher.

According to the present invention, there is provided an electro-optical device including, at least one pair of electrodes, a liquid crystal arranged between the pair of electrodes, a switching element connected with one of the electrodes, and another switching element connected with the other electrode.

As an example of the above structure, there is one pixel of an active matrix type liquid crystal display device. In this state, it is characterized that a switching element is arranged in each of a pair of electrodes constructing a pixel. As a switching element, a P-type or N-type TFT, a nonlinear element, an element having a diode characteristic or the like can be used.

A plurality of switching elements may be arranged for one pixel. Also, a plurality of switching elements may be arranged for redundancy. Further, a complementary type element by combining a p-type TFT with an N-type TFT, for example, may be used.

According to the present invention, there is provided an electro-optical device including a structure in which a liquid crystal is arranged between a pair of substrates, wherein switching elements are arranged at a matrix form in each corresponding substrate, pixel electrodes are connected with each of the corresponding switching elements.

The above structure is characterized by arranging switching elements in each of a pair of corresponding electrodes constructing a pixel in each pixel portion arranged at a matrix form.

According to the present invention, there is provided an electro-optical device including a structure in which a liquid crystal is arranged between a pair of electrodes, wherein TFTs each having the same polarity are connected with each of the pair of corresponding electrodes, and two TFTs are operated (driven) simultaneously.

According to the present invention, there is provided an electro-optical device including a structure in which a liquid crystal is arranged between a pair of electrodes, wherein an N-channel type TFT is connected with one of the electrodes, a P-channel type TFT is connected with the other electrode, and the N-type and P-type TFTs are operated simultaneously.

According to the present invention, there is provided an electro-optical device including a structure in which a liquid crystal is arranged between a pair of electrodes, wherein TFTs are connected with each of the corresponding electrodes, a signal having a desired phase is supplied to a source of one of TFTs connected with one of the electrode, and a signal having a phase opposite to the desired phase is supplied to a source of the other TFT connected with the other electrode.

According to the present invention, there is provided an electro-optical device including a structure in which a liquid crystal is arranged between a pair of electrodes, wherein switching elements are arranged in each of the corresponding electrodes and one of the switching elements does not overlap with another one of the switching elements.

According to the present invention, there is provided an electro-optical device including a structure in which a liquid crystal is arranged between a pair of electrodes, wherein switching elements are arranged in each of the corresponding electrodes and one of the switching elements is shifted from the other switching element.

In a structure that a liquid crystal is arranged (held) between a pair of electrodes, switching elements are arranged in each of the electrodes. Therefore, when a voltage having an alternating waveform is applied to the liquid crystal, a maximum voltage to be applied to the liquid crystal can be set to the same voltage as the switching elements. This voltage is twice in a conventional case wherein a switching element is arranged in only one of the electrodes. Also, when a desired voltage is applied to a liquid crystal, a voltage applied to the switching elements can be half in comparison with the conventional case.

As a result, when a TFT is used as a switching element, since a voltage applied to the TFT (a voltage applied between the source and the drain) can be low, deterioration of a TFT can be prevented and an OFF current can be reduced.

Also, by supplying voltages each having an opposite phase the sources of TFTs arranged in a pair of electrodes, a voltage which can be applied to a liquid crystal can be increased. When voltages applied to the sources of two TFTs each have a rectangular alternating waveform with an amplitude of V/2, by shifting phases each other by 180°, a voltage applied to a liquid crystal has a waveform with an amplitude of V.

DETAILED DESCRIPTION OF THE PREFERRED EMBODIMENTS

[Embodiment 1]

Figure 1:
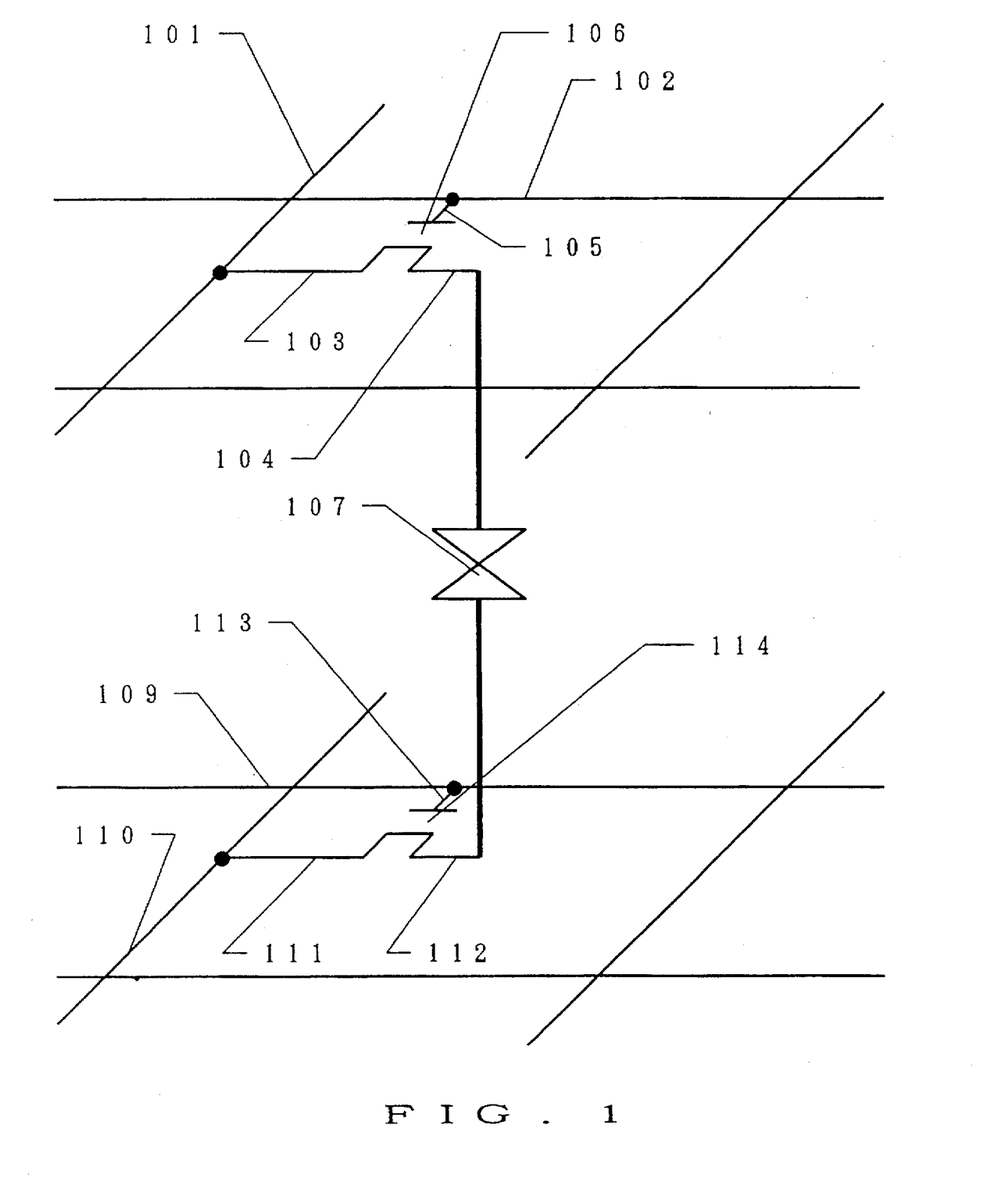
FIG. 1 shows a schematic pixel portion to be arranged at a matrix form in an electro-optical device according to an embodiment of the present invention.

FIG. 1 shows a schematic structure according to an embodiment of the present invention, that is, a basic structure of one pixel in an active matrix type liquid crystal display device. In FIG. 1, a source line 101, a gate line 102 and a thin film transistor (TFT) 106 are formed on one of a pair of substrates (not shown), and a source line 111, a gate line 109 and a TFT 114 are formed on the other substrate. As the pair of substrates, a glass substrate is used, and a liquid crystal (material) 107 is held between the substrates. An auxiliary capacitor (not shown) is arranged in parallel to the liquid crystal 107, if necessary.

In the structure of FIG. 1, the TFTs 106 and 114 are N-channel type TFT. Half of a voltage to be applied to the liquid crystal 107 is applied to each of the TFTs 106 and 114.

[Embodiment 2]

In the embodiment, a forming process of a structure of FIG. 1 with respect to one pixel is described below. However, a number of pixels are arranged at matrix form.

Figure 3A:
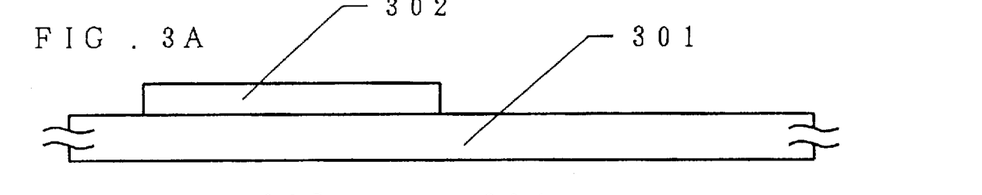
FIGS. 3A and 3D show a thin film transistor (TFT) forming process according to the embodiment.

FIGS. 3A to 3D show a forming process. A glass substrate (for example, Corning 7059 glass substrate) on which a silicon oxide film (not shown) is formed as a base film is prepared. An amorphous silicon film having a thickness of 1000 Å is formed on the glass substrate 301 by plasma chemical vapor deposition (plasma CVD) or low pressure thermal CVD, and then crystallized by a desired method such as a laser light irradiation and a heat treatment. Further, the crystallized silicon film is patterned with a size of an active layer of a TFT, to obtain the active layer 302. The active layer is a silicon semiconductor having crystalline. (FIG. 3A)

Figure 3B:
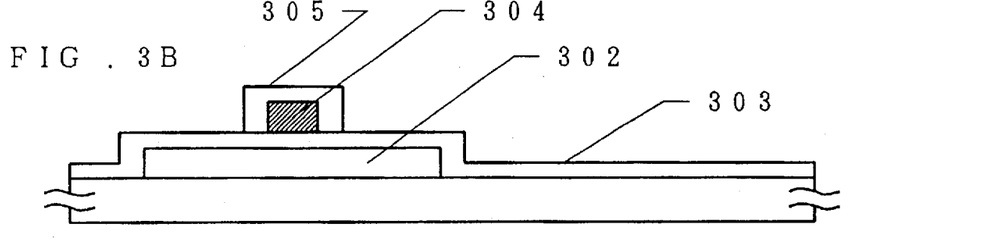

A silicon oxide film 303 having a thickness of 1000 Å is formed as a gate insulating film by sputtering or plasma CVD. Also, a film containing mainly aluminum for forming a gate electrode is formed at a thickness of 5000 Å by an evaporation and then patterned to form a gate electrode 304. Further, anodization is performed using the gate electrode 304 as an anode in an electrolytic solution, to form an oxide layer 305 having a thickness of about 2000 Å. The thickness of the oxide layer is used to form offset gate regions. (FIG. 3B)

Figure 3C:
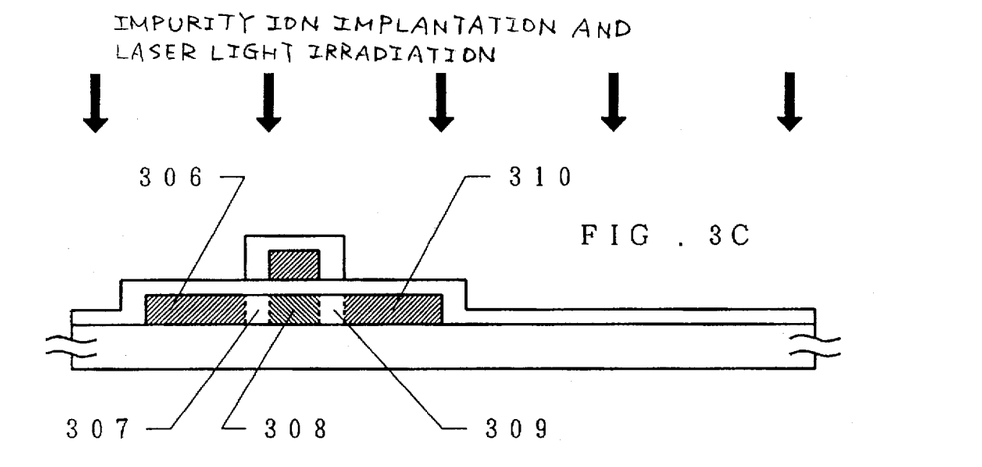

By ion implantation or plasma doping, a phosphorus ion ($P^+$) is doped. Also, by irradiating with a laser light or an intense light (infrared light), regions in which an ion is doped are annealed and activated. As a result, a source region 306, a drain region 310, a channel forming region 308, and offset gate regions 307 and 309 are formed in a self-alignment. (FIG. 3C)

Figure 3D:
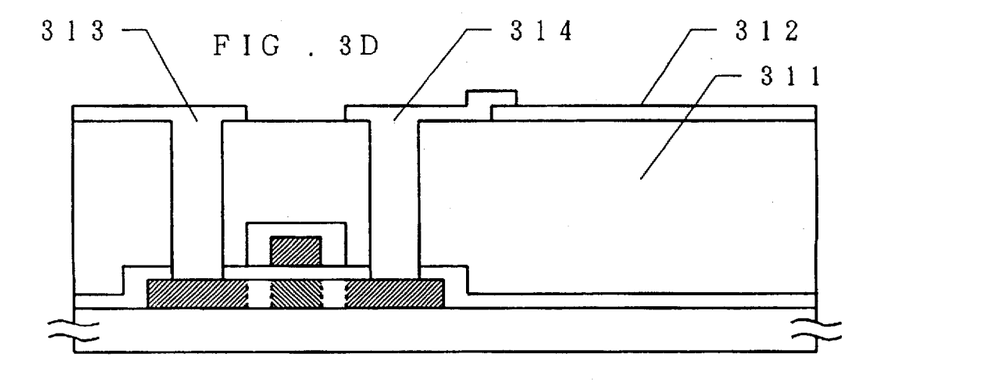

A silicon oxide or silicon oxide film 311 is formed as an interlayer insulating film by plasma CVD. The interlayer insulating film may be formed by a laminate which has a silicon oxide film and a silicon nitride film, or a laminate which has a silicon oxide film, a silicon nitride film, and a resin material such as polyimide.

After that, a transparent electrode (indium tin oxide, ITO) 312 is formed. The transparent electrode 312 is constructed as a pixel electrode. After contact hole formation, a source electrode 313 and a drain electrode 314 are formed using a metal material such as aluminum. (FIG. 3D)

As a result, one pixel is formed on one of the substrates. The TFT as shown in FIG. 3D corresponds to, for example, the TFT 114 of FIG. 1. The source 111 corresponds to the source electrode 313 and the drain 112 corresponds to the drain electrode 314. The transparent electrode 312 is used as a pixel electrode arranged in one side of the liquid crystal 107.

In the embodiment, a structure in one of the substrates is shown. However, the same structure is formed on the other substrate. A liquid crystal is charged into a space between two substrates, so that a liquid crystal cell can be constructed.

[Embodiment 3]

Figure 4:
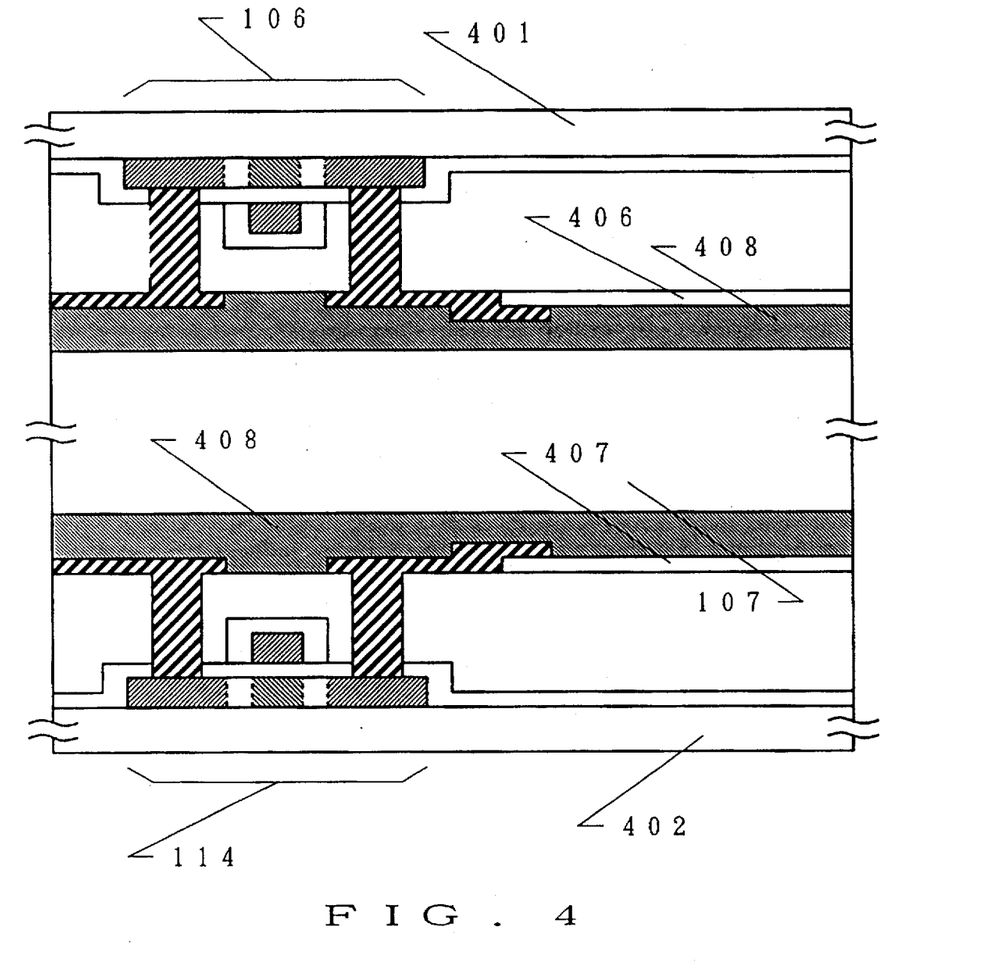
FIG. 4 shows a schematic pixel portion using two TFTs according to the embodiment.

FIG. 4 shows one pixel electrode in an example of a structure of a liquid crystal display device. In FIG. 4, the liquid crystal 107 is arranged between one pair of glass substrates 401 and 402. A kind of the liquid crystal 107 is not limited. The liquid crystal 107 is aligned with an alignment (orientation) film 408 formed by a resin material such as polyimide.

A desired electric field is applied to the liquid crystal 107 by one pair of transparent electrodes (pixel electrodes) 406 and 407. The transparent electrodes 406 and 407 are connected with sources of the TFTs 106 and 114. The TFTs 106 and 114 each has the same structure as the TFT of FIG. 3D. In the structure of FIG. 4, The TFT 106 is opposite to the TFT 114. However, the TFT 106 may be shifted from the TFT 114.

[Embodiment 4]

An operation method of one pixel portion is described with FIGS. 1 and 4. The embodiment relates to an operation in a case wherein the TFT 106 is an N-channel type and the TFT 114 is a P-channel type.

Figure 5A:
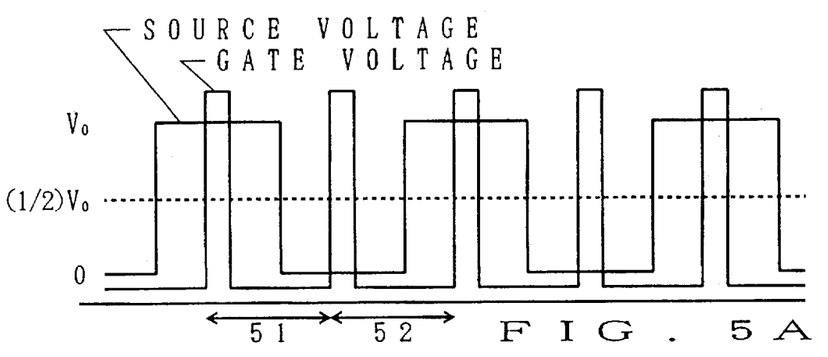
FIGS. 5A to 5C and FIG. 6A to 6C show a timing chart for driving a structure of FIG. 1.
Figure 5B:
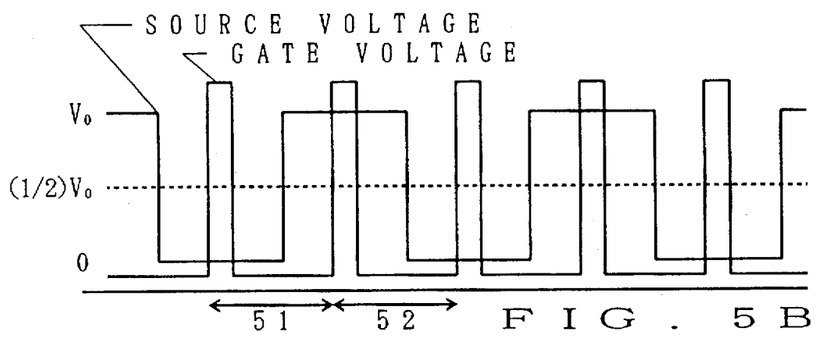

FIGS. 5A to 5C show an example of a timing chart, that is, timings of voltages applied to a source and a gate in each TFT. A source voltage of FIG. 5A is a voltage supplied from the source arrangement 101 of FIG. 1. A gate voltage of FIG. 5A is a voltage supplied from the gate arrangement 102 of FIG. 1. A source voltage of FIG. 5B is a voltage supplied from the source arrangement 110 of FIG. 1. A gate voltage of FIG. 5B is a voltage supplied from the gate arrangement 109 of FIG. 1.

Figure 5C:
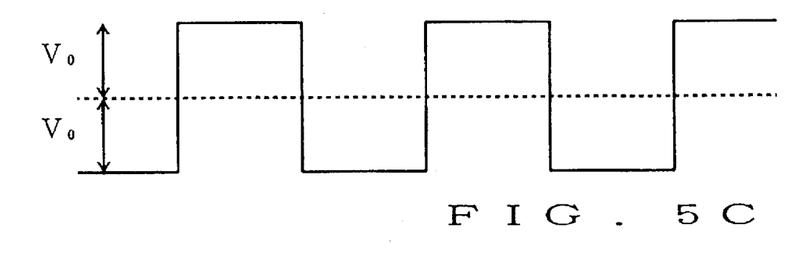

FIG. 5C shows a voltage applied to the liquid crystal 107. In particular, FIG. 5C shows a case wherein a display is maintained at a state having a block or white (transparent or no transparent) by applying an alternating signal having a rectangular form to a liquid crystal such as a twisted nematic (TN) type liquid crystal. In a practical display, the source voltage(s) of FIG. 5A and/or FIG. 5B is modulated with a video signal, so that an image display is performed.

When $V_0=10$ (V), that is, when a voltage having a rectangular form and an amplitude of 5 (v) is applied to a source, a voltage of +5 (V) is applied to the source line 101 in an initial state of a period 51. In this state, since a voltage is applied to a gate, a voltage in the drain 104 is +5 (V). Also, when a voltage of −5 (V) is applied to the source line 110, a voltage of the drain 112 is −5 (V). Therefore, when a voltage of the source 112 is a standard voltage, a voltage applied to the liquid crystal 107 is 10 (V).

Further, in an initial state of a period 52, when a voltage of −5 (V) is applied to the source line 101, since a voltage is applied to a gate, the drain 104 is a voltage of −5 (V). Also, when a voltage of +5 (V) is applied to the source line 110, a voltage of the drain 112 is +5 (V). Therefore, when a voltage of the source 112 is a standard voltage, a voltage applied to the liquid crystal 107 is −10 (V).

As a result, a voltage of ±10 is applied repeatedly to the liquid crystal 107. Therefore, in this state, the same voltage as a voltage applied between sources and drains of the TFTs 106 and 114 can be applied to the liquid crystal 107.

In the embodiment, a voltage applied to a source and a drain of one of the TFTs coincides with a voltage applied to a source and a drain of the other TFT. However, different voltages may be applied.

[Embodiment 5]

Figure 6A:
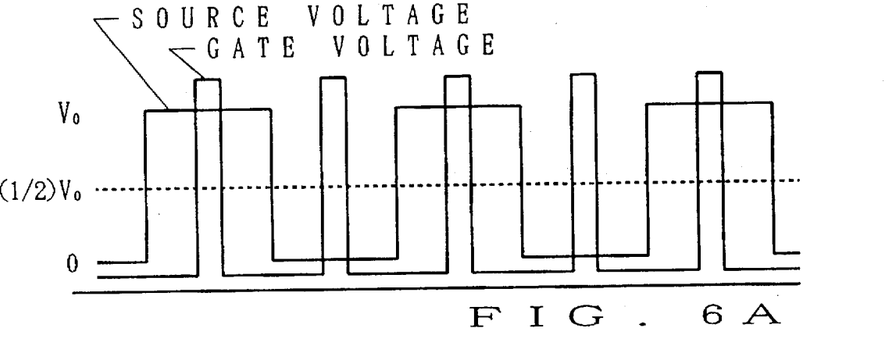
Figure 6B:
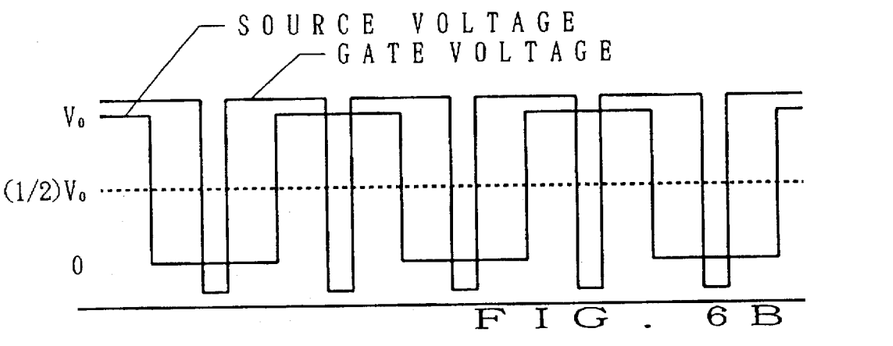
Figure 6C:
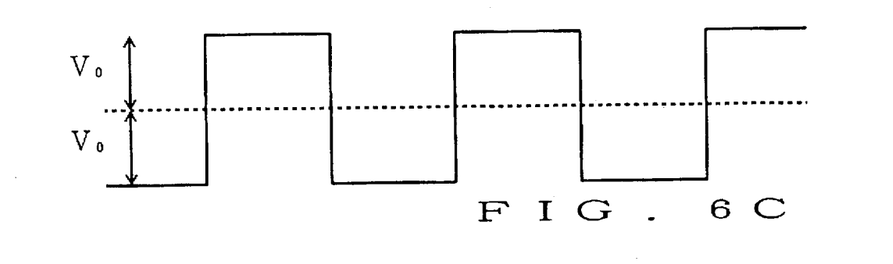

The embodiment relates an operation in a case wherein the TFT 106 is an N-channel type and the TFT 114 is a P-channel type. FIGS. 6A to 6C show an example of a timing chart. FIG. 6A shows a voltage supplied to the N-channel type TFT 106 and a voltage supplied from the source line 101. FIG. 6B shows a voltage applied to the P-channel type TFT 114 and a voltage supplied from the source line 110. FIG. 6C shows a voltage applied to the liquid crystal 107.

In a timing chart of FIGS. 6A to 6C, a high frequency voltage which has a rectangular form and is repeated at a constant frequency is applied to a liquid crystal, so that a black display or a white display is maintained. In a practical display, the source voltage(s) of FIG. 6 and/or FIG. 6B is modulated with a video signal, so that an image display is performed.

[Embodiment 6]

Figure 7:
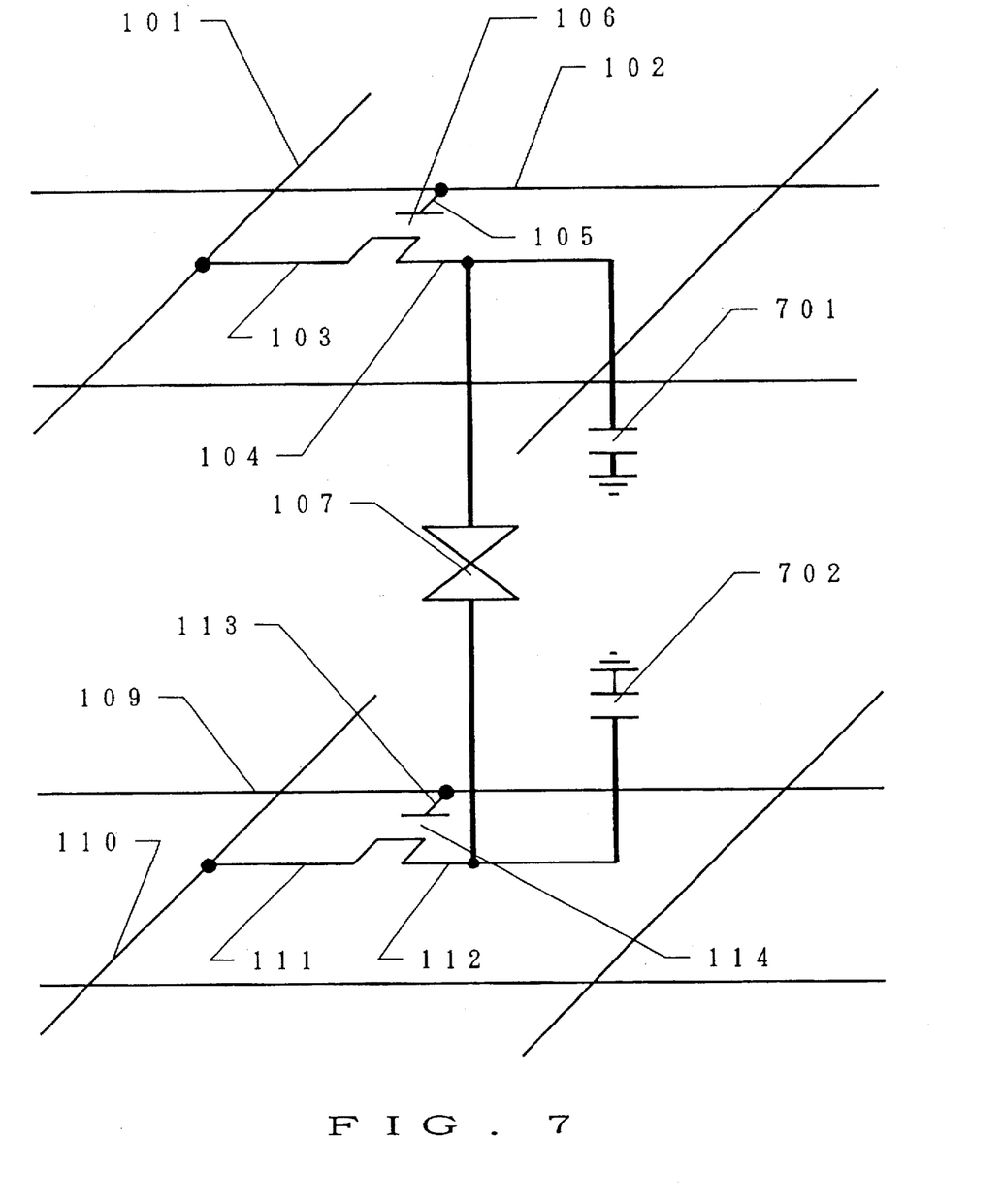
FIG. 7 shows a schematic pixel portion to be arranged at a matrix form in an electro-optical device according to another embodiment.

FIG. 7 shows a structure in which capacitors 701 and 702 are arranged in the structure of FIG. 1. The capacitors 701 and 702 having necessary capacitance may be used in accordance with a kind of a liquid crystal or the like. Also, the capacitors 701 and 702 having different capacitances may be used in accordance with a polarity of each TFT or the like.

[Embodiment 7]

Figure 8:
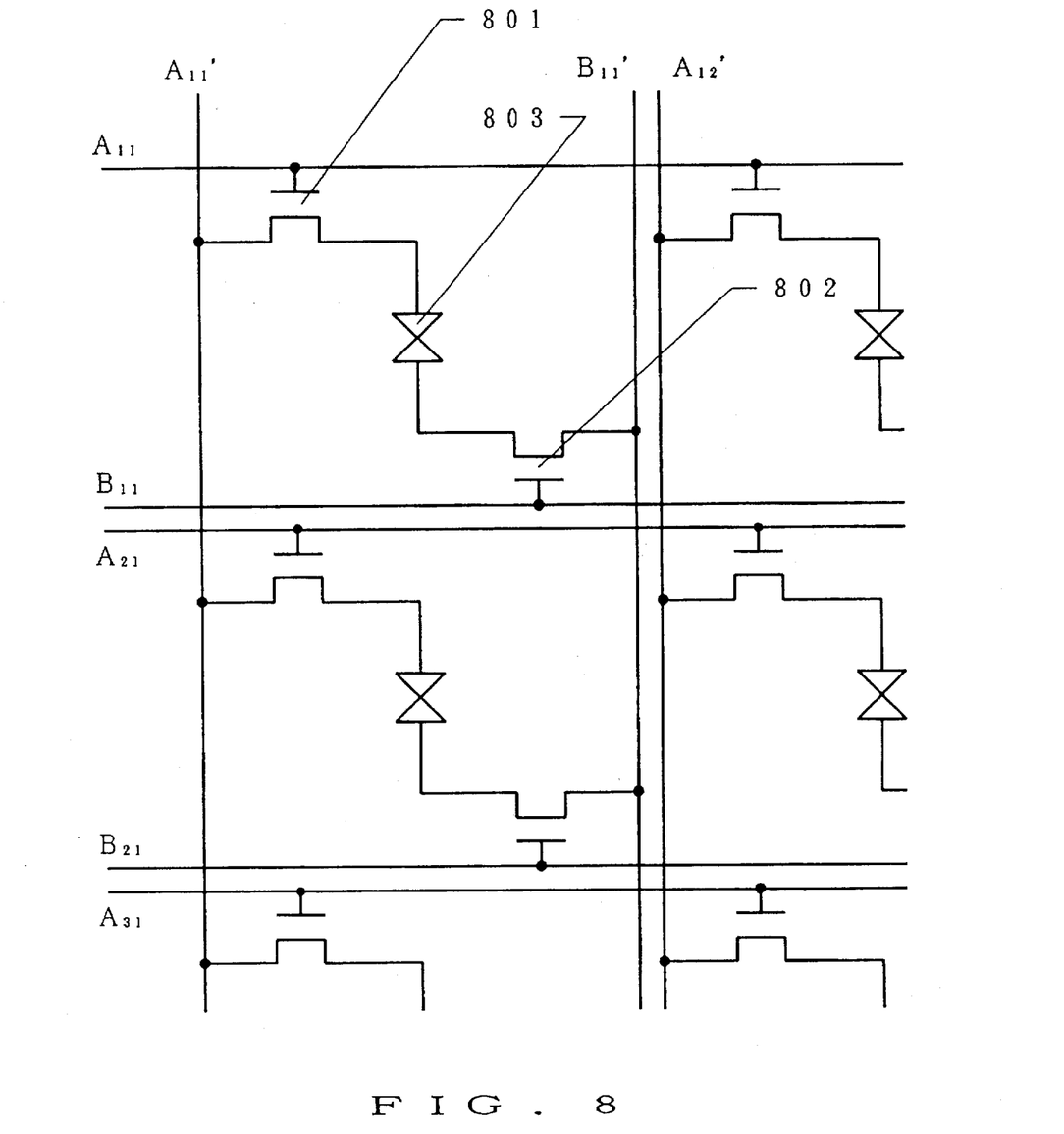
FIG. 8 shows a circuit arrangement of a pixel portion to be arranged at a matrix form in an electro-optical device according to the embodiment.

In the embodiment, an equivalent circuit in a case wherein a plurality of pixels (each pixel has a structure of FIG. 1) are arranged at a matrix form, as shown in FIG 8. In FIG. 8, $A_{nm}$ and $A_{nm}'$ represent arrangements formed on one of substrates, and $B_{nm}$ and $B_{nm}'$ represent arrangements formed on the other substrate. That is, in FIG. 8, $A_{nm}$ and $A_{nm}'$ represent arrangements formed on one of substrates (backward the figure), and $B_{nm}$ and $B_{nm}'$ represent arrangements formed on the other substrate (forward the figure).

A liquid crystal 803 is driven by a TFT 801 arranged in one of the substrates and a TFT 802 arranged in the other substrate. In FIG. 8, $A_{11}$ is a source line formed on one of substrates and $A_{m1}$ is a gate line formed on the one of the substrates. Also, $B_{11}$ is a source line formed on the other substrate and $B_{m1}$ is a gate line formed on the other substrate.

Figure 9:
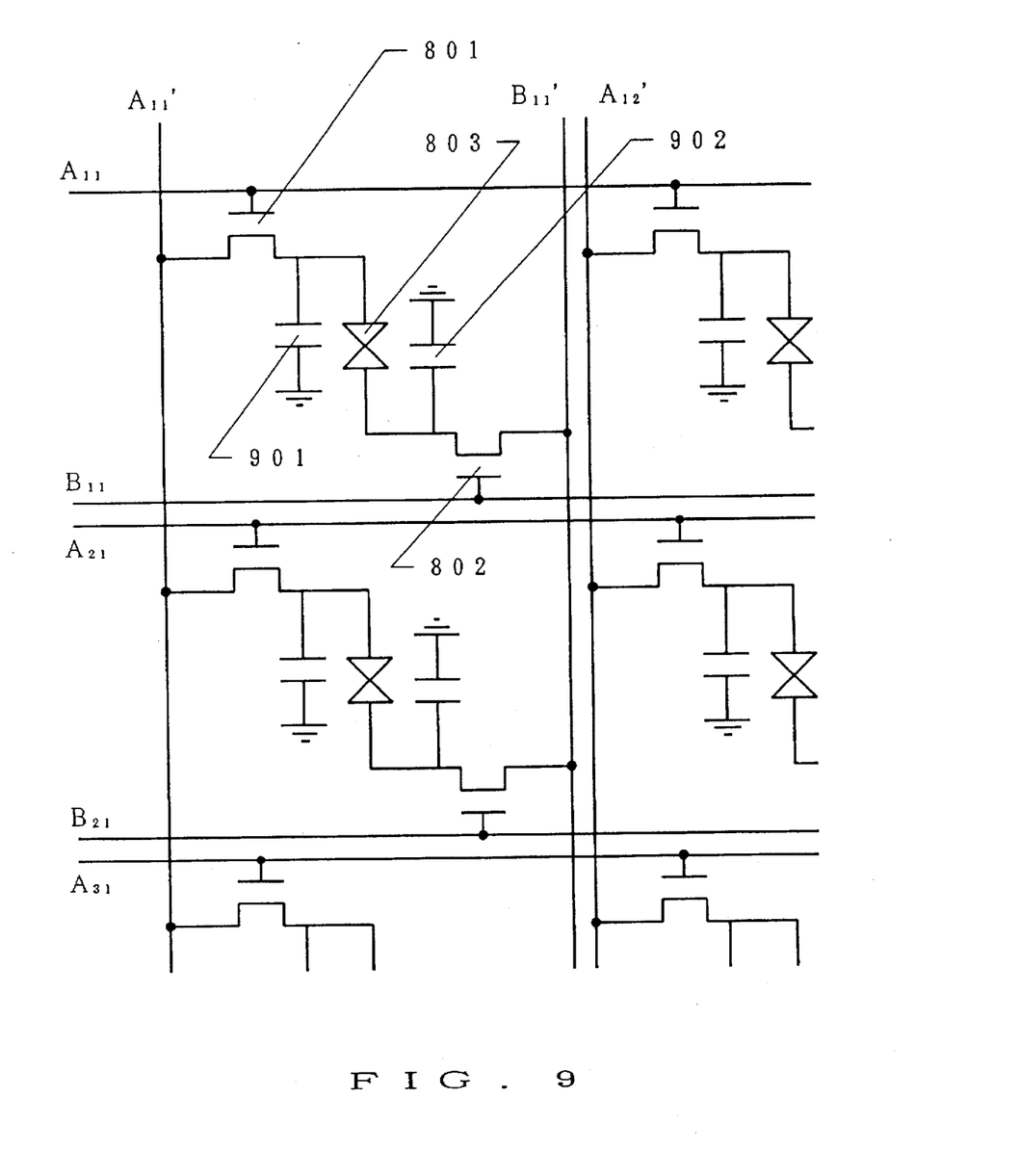
FIG. 9 shows a circuit arrangement of a pixel portion to be arranged at a matrix form in an electro-optical device according to the another embodiment.

FIG. 9 shows a structure in which auxiliary capacitors 901 and 902 are arranged in the structure of FIG. 8. Values of the auxiliary capacitors 901 and 902 are set in accordance with a kind of a liquid crystal, a driving method and the like. Different capacitances may be used. Also, only one of the auxiliary capacitors may be arranged.

[Embodiment 8]

The embodiment shows an example of a monolithic structure having TFTs arranged in pixels constructed at a matrix form and a peripheral circuit for driving the TFTs arranged in the pixels, on a surface of each of a pair of substrates.

As a pixel peripheral circuit in an active matrix type liquid crystal display device, a shift register system or a decoder and driver system is used. These circuits are constructed by integrated circuits (ICs) and connected with a peripheral portion of pixels by tape automated bonding (TAB). However, by further integrating and forming these circuits on a glass substrate, a compact and light device can be obtained. In the embodiment, by forming TFTs arranged in pixels and a peripheral circuit at the same time, necessary circuits are constructed by thin film integrated circuits within a pair of glass substrates.

Figure 10A:
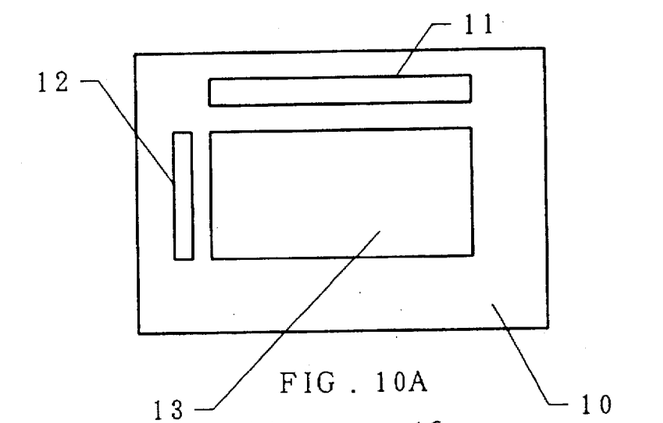
FIGS. 10A to 10C show a schematic structure of a liquid crystal display panel having a peripheral circuit.
Figure 10B:
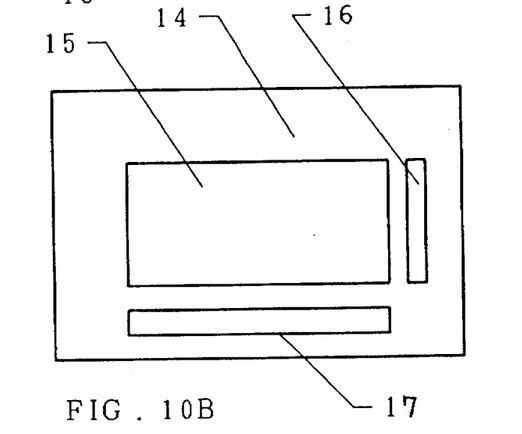
Figure 10C:
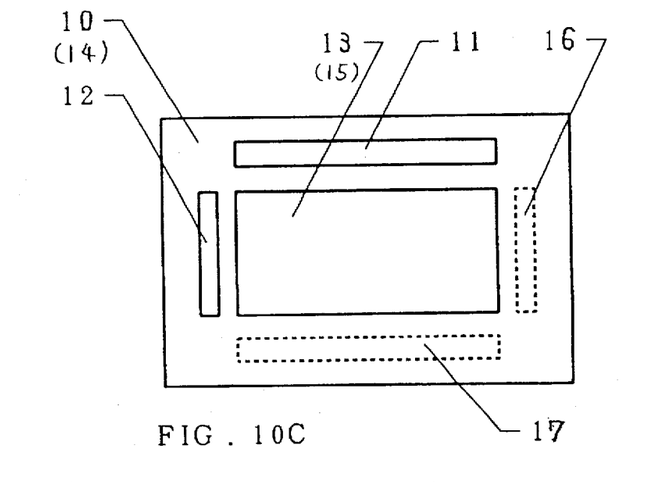

FIGS. 10A to 10C show schematic structures of the embodiment. A liquid crystal is arranged between a pair of substrates 10 and 14, so that a liquid crystal display device is constructed. Each pixel has the same structure as the structure of FIG. 1 or FIG. 7, and the pixels are arranged at a matrix form.

TFTs corresponding to pixels are arranged on each of the substrates. Peripheral circuits for driving TFTs arranged in each pixel are also formed as a thin film integrated circuit on the substrates.

A kind of a peripheral circuit may be selected, if necessary. That is, when a circuit which is arranged near pixels and processes necessary signals in an image display or the like is used, a kind of a peripheral circuit is not limited. As a peripheral circuit, for example, a decoder and driver circuit can be used.

In the structure of FIGS. 10A to 10C, a pixel region 13 constructed at a matrix form and peripheral circuits 11 and 12 are arranged on one substrate 10, as shown in FIG. 10A, and a pixel region 15 constructed at a matrix form and peripheral circuits 16 and 17 are arranged on the other substrate 14, as shown in FIG. 10B. Therefore, as shown in FIG. 10C, two substrates are adhered to each other, in order not to overlap with the peripheral circuits each other.

When the structure of FIG. 7 is used, necessary circuits can be integrated between a pair of substrates, and therefore it is not necessary to form arrangements using TAB in which a defect produces easily. Also, by integrating and arranging all circuits using crystalline silicon TFTs having high characteristics, a total cost can be reduced.

[Embodiment 9]

Figure 11:
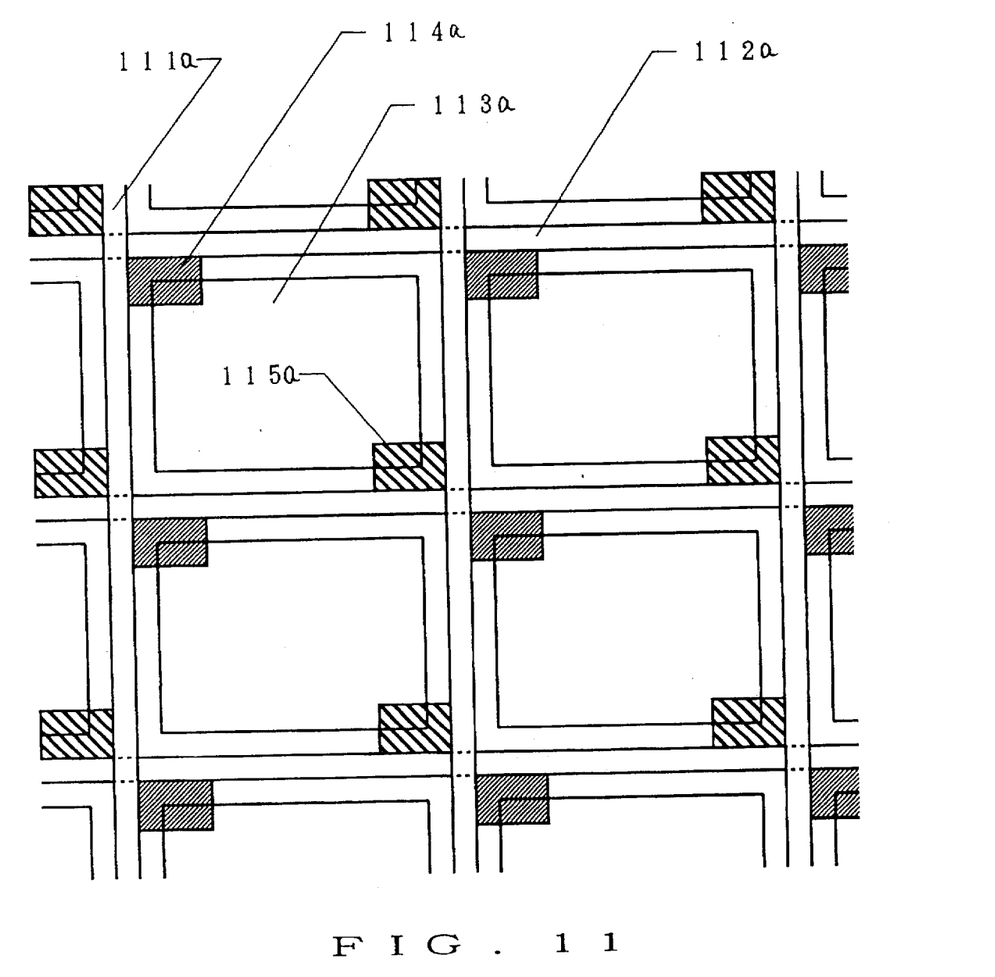
FIG. 11 shows a circuit arrangement of a pixel portion to be arranged at a matrix form in an electro-optical device according to the embodiment.

The embodiment relates to a method for arranging TFTs 801 and 802, for example. FIG. 11 shows a schematic structure of the embodiment in a case wherein a pixel region of a liquid crystal panel which has completed is viewed from one surface side. In FIG. 11, arrangements 111a and 112a and a pixel electrode 113a are formed on a substrate (forward the figure). The pixel electrode 113a is constructed to overlap with pixel electrodes each other on both substrates. TFTs are formed in a region 114a on the substrate (forward the figure), and TFTs are formed in a region 115a on the other substrate (backward the figure).

One pixel as shown in FIG. 11 can correspond to a pixel in a case wherein the structure of FIG. 1 is viewed from an upper portion of the figure. That is, it can be considered that the TFT 106 is arranged in the region 114a and the TFT 114 is arranged in the region 115a.

In the structure of FIG. 11, it is characterized that a pair of TFTs arranged in a pixel are not overlapped with each other. When such structure is formed, elements are not overlapped with each other, a possibility which an unnecessary pressure or a static electricity influences TFTs can be eliminated. Also, arrangements of each TFT can be used as black matrix. In this state, an opening (appearance) ratio in a liquid crystal panel decreases.

Further, TFTs may be arranged to overlap with each other in viewing from one surface of the panel. In this state, since elements are overlapped with in one region, there is a possibility which an unnecessary pressure or a static electricity influences TFTs. However, an opening ratio can be increased.

In the structure which a liquid crystal is arranged between a pair of electrodes, by arranging TFTs for switching in each electrode, a voltage applied to a liquid crystal can be increased. Since a voltage applied to a liquid crystal is divided by two TFTs, a voltage applied between a source and a drain of each TFT can be decreased in comparison with a case wherein a TFT is arranged in only one of the electrodes. Also, by this, TFTs can be operated in a region which an OFF current is low, so that an operation of a liquid crystal can be performed preferably. Further, by decreasing a voltage applied to TFTs to be used, deterioration of TFT can be prevented.

What is claimed is:

1. An active matrix type liquid crystal display device comprising:

a first substrate having a first pixel electrode thereon;

a second substrate having a second pixel electrode thereon, said first and second pixel electrodes facing each other;

a first transistor on said first substrate for supplying a first voltage to said first pixel electrode;

a second transistor on said second substrate for supplying a second voltage to said second pixel electrode;

a first peripheral circuit on said first substrate having a third transistor for driving said first transistor;

a second peripheral circuit on said second substrate having a fourth transistor for driving said second transistor; and a liquid crystal material interposed between said first and second pixel electrodes, wherein said liquid crystal material is switched by a voltage generated by said first and second voltages, wherein said first and second peripheral circuits are not overlapped with each other.

2. A device according to claim 1, wherein said first and second pixel electrodes do not completely overlap each other.

3. A device according to claim 1, wherein said first and second voltages have an opposite polarity to each other.

4. A device according to claim 1 wherein said first to fourth transistors include a P-channel type thin film transistor.

5. A device according to claim 1 wherein said first to fourth transistors include an N-channel type thin film transistor.

6. A device according to claim 1, wherein said first and second thin film transistors are operated in synchronism with each other.

7. A device according to claim 1, wherein said first peripheral circuit comprises a decoder circuit.

8. A device according to claim 1, wherein an absolute value of said first voltage is approximately the same as that of said second voltage.

9. An active matrix type liquid crystal display device comprising:

a first substrate having a first pixel electrode thereon;

a second substrate having a second pixel electrode thereon, said first and second pixel electrodes facing each other;

a first transistor on said first substrate for supplying a first voltage to said first pixel electrode;

a second transistor on said second substrate for supplying a second voltage to said second pixel electrode;

a first peripheral circuit on said first substrate having a third transistor for driving said first transistor;

a second peripheral circuit said second substrate having a fourth transistor for driving said second transistor; and a liquid crystal material interposed between said first and second pixel electrodes;

wherein said first and second transistors are overlapped with each other, wherein said liquid crystal material is switched by a voltage generated by said first and second voltages, and wherein said first and second peripheral circuits are not overlapped with each other.

10. A device according to claim 9, wherein said first and second thin film transistors are operated in synchronism with each other.

11. A device according to claim 9, wherein said first and second voltages have an opposite polarity to each other.

12. A device according to claim 9, wherein said first peripheral circuit comprises a decoder circuit.

13. A device according to claim 9, wherein an absolute value of said first voltage is approximately the same as that of said second voltage.

14. An active matrix type liquid crystal display device comprising:

a first substrate having a first pixel electrode thereon;

a second substrate having a second pixel electrode thereon, said first and second pixel electrodes facing each other;

a first transistor on said first substrate for supplying a first voltage to said first pixel electrode;

a second transistor on said second substrate for supplying a second voltage to said second pixel electrode;

a first peripheral circuit on said first substrate having a third transistor for driving said first transistor;

a second peripheral circuit on said second substrate having a forth transistor for driving said second transistor; and a liquid crystal material interposed between said first and second pixel electrodes, wherein said first and second transistors are not overlapped with each other, and wherein said liquid crystal material is switched by a voltage generated by said first and second voltage.

15. A device according to claim 14, wherein said first and second thin film transistors are operated in synchronism with each other.

16. A device according to claim 14, wherein said first and second voltages have an opposite polarity to each other.

17. A device according to claim 14, wherein said first peripheral circuit comprises a decoder circuit.

18. A device according to claim 14, wherein said first and second peripheral circuits are not overlapped with each other.

19. A device according to claim 14, wherein an absolute value of said first voltage is approximately the same as that of said second voltage.

20. An active matrix type liquid crystal display device comprising:

a first substrate having a first pixel electrode thereon;

a second substrate having a second pixel electrode thereon, said first and second pixel electrodes facing each other;

a first transistor on said first substrate for supplying a first voltage to said first pixel electrode;

a second transistor on said second substrate for supplying a second voltage to said second pixel electrode;

a first peripheral circuit on first substrate having a third transistor for driving said first transistor;

a second peripheral circuit on said second substrate having a fourth transistor for driving said second transistor;

a first auxiliary capacitor associated with said first transistor;

a second auxiliary capacitor associated with said second transistor; and a liquid crystal material interposed between said first and second electrodes, wherein said liquid crystal material is switched by a voltage generated by said first and second voltages, and wherein said first and second peripheral circuits are not overlapped with each other.

21. The device of claim 20, wherein said first and second thin film transistors are operated in synchronism with each other.

22. A device according to claim 20, wherein said first and second voltages have an opposite polarity to each other.

23. A device according to claim 20, wherein said first peripheral circuit comprises a decoder circuit.

24. A device according to claim 20, wherein an absolute value of said first voltage is approximately the same as that of said second voltage.

25. An active matrix type liquid crystal display device comprising:

a first substrate having a first pixel electrode thereon;

a second substrate having a second pixel electrode thereon, said first and second pixel electrodes facing each other;

a first transistor on said first substrate for supplying a first voltage to said first pixel electrode;

a second transistor on said substrate for supplying a second voltage to said second pixel electrode;

a first peripheral circuit on said first substrate having a third transistor for driving said first transistor;

a second peripheral circuit on said second substrate having a fourth transistor for driving said second transistor; and a liquid crystal material interposed between said first and second electrodes, wherein each of said first to fourth transistors has at least a channel region comprising a crystalline semiconductor film, wherein said liquid crystal material is switched by a voltage generated by said first and second voltages, and wherein said first and second peripheral circuits are not overlapped with each other.

26. A device according to claim 25, wherein said first and second thin film transistors are operated in synchronism with each other.

27. A device according to claim 25, wherein said first and second voltages have an opposite polarity to each other.

28. A device according to claim 25, wherein said first peripheral circuit comprises a decoder circuit.

29. A device according to claim 25, wherein an absolute value of said first voltage is approximately the same as that of said second voltage.

* * * * *